(12) United States Patent
Xu et al.

(10) Patent No.: US 10,509,222 B2
(45) Date of Patent: Dec. 17, 2019

(54) MULTI-DIRECTIONAL BAR CODE SCANNING DEVICE HAVING MULTIPLE LASER EMITTERS MATCHED WITH SINGLE PHOTOSENSITIVE RECEIVER

(71) Applicant: SUNLUX IOT TECHNOLOGY (GUANGDONG) INC., Guangzhou, Guangdong (CN)

(72) Inventors: Long Xu, Guangdong (CN); Yufeng Li, Guangdong (CN); Fanchun Zeng, Guangdong (CN)

(73) Assignee: SUNLUX IOT TECHNOLOGY (GUANGDONG) INC., Guangzhou (CN)

( * ) Notice: Subject to any disclaimer, the term of this patent is extended or adjusted under 35 U.S.C. 154(b) by 0 days.

(21) Appl. No.: 16/318,703

(22) PCT Filed: Jan. 11, 2017

(86) PCT No.: PCT/CN2017/070836
§ 371 (c)(1),
(2) Date: Jan. 17, 2019

(87) PCT Pub. No.: WO2018/014521
PCT Pub. Date: Jan. 25, 2018

(65) Prior Publication Data
US 2019/0258051 A1  Aug. 22, 2019

(30) Foreign Application Priority Data
Jul. 19, 2016 (CN) .......................... 2016 1 0573612

(51) Int. Cl.
*G02B 26/12* (2006.01)
*G06K 7/10* (2006.01)

(52) U.S. Cl.
CPC ......... *G02B 26/123* (2013.01); *G02B 26/128* (2013.01); *G06K 7/10613* (2013.01); *G06K 7/10831* (2013.01)

(58) Field of Classification Search
None
See application file for complete search history.

(56) References Cited

FOREIGN PATENT DOCUMENTS

| CN | 2639957 Y | 9/2004 | |
|---|---|---|---|
| CN | 103745189 A * | 4/2014 | ......... G06K 7/10831 |

(Continued)

OTHER PUBLICATIONS

International Search Report of PCT Patent Application No. PCT/CN2017/070836 dated Mar. 24, 2017.

*Primary Examiner* — Kristy A Haupt

(57) ABSTRACT

A multi-directional bar code scanning device having multiple laser emitters matched with a single photosensitive receiver is disclosed. Multiple paths of laser beams generated by N laser emitters are projected towards a rotatable reflector group via a light projection reflector, and the rotatable reflector group projects the laser beams towards tilted reflector groups, such that multiple paths of laser scanning beams are generated and projected towards a bar code. A beam scatter by the bar code is reflected reversely towards a light collection reflector and focused on a single photosensitive receiver. The device can increase the number of scanning beams and the scanning directions, thereby expanding the scope of depth of field, and preventing the issues which multiple photosensitive receiver cannot operate simultaneously when a single channel is utilized and preventing non-coaxial optical signal crosstalk, thus improving decoding speed, and lowering the cost of the device.

7 Claims, 4 Drawing Sheets

(56) References Cited

FOREIGN PATENT DOCUMENTS

| CN | 103745189 A | 4/2014 |
| CN | 103761501 A | 4/2014 |
| WO | 2015019369 A1 | 2/2015 |

\* cited by examiner

MULTI-DIRECTIONAL BAR CODE SCANNING DEVICE HAVING MULTIPLE LASER EMITTERS MATCHED WITH SINGLE PHOTOSENSITIVE RECEIVER

FIELD OF THE INVENTION

The present invention relates to bar code scanners and, more particularly to a multi-directional bar code scanning device having multiple laser emitters matched with a single photosensitive receiver.

BACKGROUND OF THE INVENTION

Barcode scanning technology has been widely used in warehouse management, cashier payment, etc., which helps to improve work efficiency and intelligent management. Based on the differences on code class, printing material and screen display medium of the one-dimensional bar code and the two-dimensional bar code, the bar code scanning device is mainly divided into an image type bar code scanner and a laser bar code scanner. Specifically, the scanning speed, scanning distance, scanning sensitivity of the laser bar code scanners are better than the image type bar code scanners.

Since the laser bar code scanning device is a single-line scanner, the number and the direction of the laser scanning lines are important factors affecting the bar code reading effect. Generally speaking, if the quantity and the direction of the scanning lines are more, the scanning effect of the device is better. In the prior art, the solution is to increase the direction and quantity of the laser scanning line by adding laser emitters and photosensitive receivers correspondingly matched with the laser emitters, thereby improving the bar code recognition effect. However, since the prior art adopts single channel with one laser emitter matching with one photosensitive receiver to recycle the laser beam, so as to proceed with photoelectric conversion decoding, thus the plurality of photosensitive receivers cannot work effectively at the same time, non-coaxial optical signal crosstalk will be generated among the photosensitive receivers. Further, the use of multiple photosensitive receivers leads to higher hardware costs.

In laser bar code scanning applications, high-resolution bar code recognition is mainly affected by the laser half-width and resolution. Low-resolution bar code recognition is mainly affected by laser spot intensity and depth of field, but a single laser source cannot balance spot resolution and depth of field. Therefore, a single laser emitter barcode scanner has a limitation that cannot simultaneously extend the high-resolution depth of field and low-resolution depth of field.

SUMMARY OF THE INVENTION

An objective of the present invention is to provide a multi-directional bar code scanning device having multiple laser emitters matched with a single photosensitive receiver, thereby increasing scanning lines and scanning directions, improving scanning speed and reducing hardware cost.

The present invention provides a multi-directional bar code scanning device having multiple laser emitters matched with a single photosensitive receiver, comprising:

a housing, with a recess formed on a middle of the housing, a light source groove and a light projection reflector support being provided at a side of the housing, and a light collection rectangular aperture formed on a bottom of the recess;

N laser emitters, fixed in the light source groove via an installation component and adapted for emitting N laser beams and projecting the N laser beams at a certain projected path, therein N is an integer and N≥2;

N light projection reflectors, located above the light source groove and mounted on the light projection reflector support to match with the N laser emitters correspondingly;

a light collection reflector, located at a front of the N light projection reflectors, with N light projection apertures being formed on a middle of the light collection reflector to match with the N light projection reflectors correspondingly;

a rotatable reflector group, configured in the recess and located opposite to the N light projection reflectors;

a tilted reflector group, including a plurality of reflectors at different angles which are configured at a ring surface of the recess; and a photosensitive receiver, located beneath the light collection rectangular apertures and opposite to the light collection reflectors;

wherein the N laser beams emitted from the N laser reflectors are emitted to the N light projection reflectors correspondingly, pass through the N light projection apertures on the light collection reflector, then are reflected by the rotatable reflector group and the tilted reflector group in turn to form N baseline laser scanning beams to project on a target bar code; after scattered by the target bar code, the N baseline laser scanning beams are reflected reversely to the light collection reflectors and focused to the photosensitive receiver which is arranged for converting an optical signal to an electrical signal.

In comparison with the prior art, the present invention uses multiple laser emitters matched with a single photosensitive receiver, specifically, multiple laser beams emitter from the N laser emitters are projected to the light projection reflectors, the rotatable reflector group and the tilted reflector group in turn, thereby multiple laser scanning beams are projected to the bar code; after scattered by the target bar code, the laser scanning beams are reflected to the light collection reflectors against the light projecting path and focused to the photosensitive receiver. On one hand, scanning direction and the scanning line quantity are increased since multiple laser emitters are used, thereby improving bar code scanning speed and recognition effect. On the other hand, a single photosensitive receiver is adapted for receiving optical signal from the multiple laser scanning lines and the bar code, thereby preventing the optical signal crosstalk, benefitting to improve optical signal obtaining and decoding speed, and reducing the hardware cost.

In a preferable embodiment, N=2, and the N laser emitter are emitted at the same direction, with angles between the N laser beams are smaller than 3 degrees.

Preferably, the N light projection reflectors are tilted relative to a horizontal plane of the housing at different angles.

In such a way, the angles between the N laser beams emitted from the N laser emitters are compensated, thereby ensuring the laser beams to be collected quasi-coaxially, preventing non-coaxial optical signal crosstalk among the multiple photosensitive receivers, and reducing hardware cost and improving decoding performance.

Preferably, the laser beams emitted from the N laser emitters are focused and aligned by the lens and then spread at different positions from far to near.

By using multiple laser emitters to handle the far depth of field and the near depth of field, thereby the high-resolution depth of field and low-resolution depth of field are extended.

Preferably, the N laser emitters are driven in turn, with a driving frequency is a quarter of motor frequency of the rotatable reflector group.

Preferably, the rotatable reflector group includes a motor and four reflectors located at a side of the motor, angles formed between each reflector and a horizontal plane of the housing are arranged in an arithmetic progression, and the four reflectors are rotatable at a certain frequency under control of the motor.

Preferably, the tilted reflector group is composed of six oblique trapezoidal reflectors with an obtuse angle formed between two adjacent reflectors, and a multi-directional scanning beam pattern composing of six sets of parallel rays is formed.

Preferably, the device further includes a circuit and decoding module adapted for processing and decoding the electrical signals from the photosensitive receiver, thereby obtaining information of the target bar code.

In the present invention, the multi-directional bar code scanning device having multiple laser emitters matched with a single photosensitive receiver preferably uses rotatable tetrahedral mirrors and hexahedral titled mirrors to achieve scanning line extension and light path extension, thereby increasing the scanning direction and the scanning line quantity (48 scanning lines, six directions), and improving bar code scanning speed and recognition effect. Further, the scanning speed of the device can be controlled by the motor in the rotatable reflector group, when the rotating frequency of the motor is 68 Hz, the scanning speed of the device can reach 3264 lines per second.

BRIEF DESCRIPTION OF THE DRAWINGS

The accompanying drawings facilitate an understanding of the various embodiments of this invention. In such drawings.

DETAILED DESCRIPTION OF ILLUSTRATED EMBODIMENTS

A distinct and full description of the technical solution of the present invention will follow by combining with the accompanying drawings. By all appearances, the embodiments to be described just are a part of embodiments of the present invention, not the all. Based on the embodiment of the present invention, all other embodiments obtained by the person ordinarily skilled in the art without any creative work pertain to the protection scope of the present invention.

Figure 1:
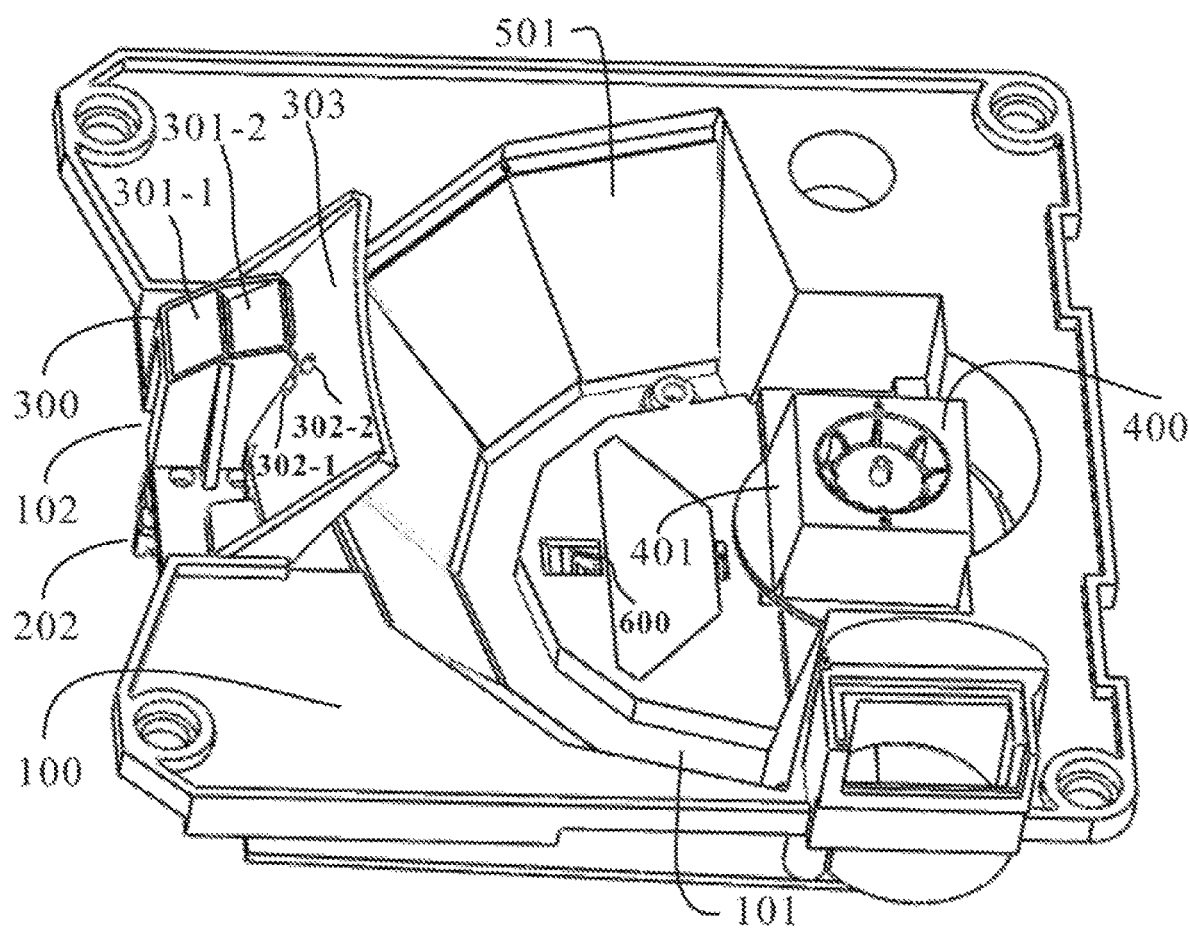
FIG. 1 is a schematic view of a multi-directional bar code scanning device having multiple laser emitters matched with a single photosensitive receiver according to one embodiment of the present invention.

Referring to FIG. 1, a schematic view of a multi-directional bar code scanning device having multiple laser emitters matched with a single photosensitive receiver according to one embodiment of the present invention is shown.

As illustrated, the multi-directional bar code scanning device includes a housing 100, N laser emitters 202, N light projection reflectors 301, a light collection reflector 303, a rotatable reflector group 400, a tilted reflector group 501-506, and a photosensitive receiver (located beneath a light collection rectangular aperture 600, and not shown in FIG. 1), wherein N is an integer, and N≥2. It should be noted, the following drawings and embodiment is described by taking as an example with N=2, but the invention can be extended to other embodiments with more laser emitters matched with a single photosensitive receiver.

Specifically, a recess 101 is formed on the middle of the housing 100, a rectangular aperture 600 and a rotatable reflector group 400 are formed on the recess 101, and one side of the housing 100 is provided with a light source slot 102 and a light projection reflector support 300. Specifically, geometrical centers of the light source slot 102, the light projection reflector support 300, the rectangular aperture 600 and the rotatable reflector group 400 are located at a longitudinal mid vertical plane of the housing 100.

The N laser emitters 202 are fixed in the light source slot 102 by means of an installation component, for emitting N laser beams and projecting the laser beams.

Figure 2:
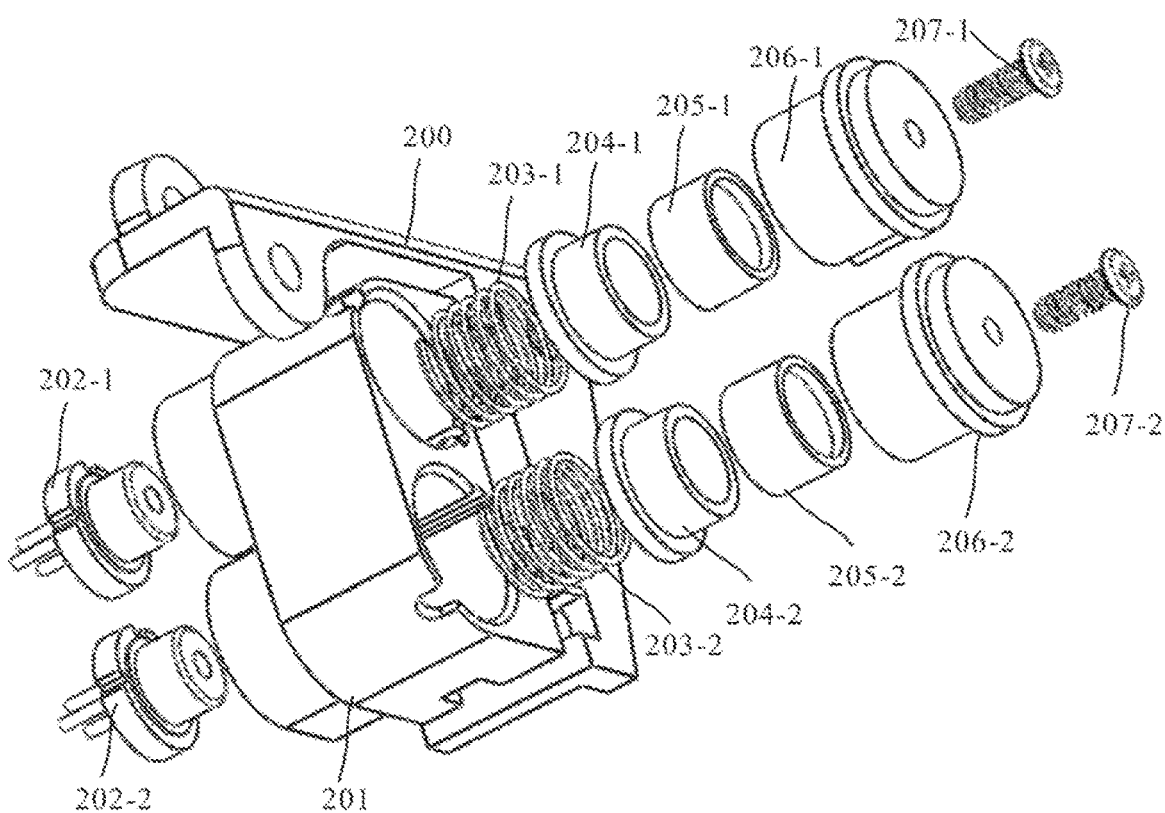
FIG. 2 is an exploded view of a double laser emitter shown in FIG. 1.

In a preferable embodiment, the laser emitter is a double laser emitter, that is N=2. As shown in FIG. 2, a double laser emitter is illustrated. Installation components for this double laser emitter include a holder 200 and a retainer 201 fixed on the holder 200, the holder 200 is fixed in the light source slot 102 of the housing 100 by means of screws, and the retainer 201 having two through holes that are at an angle smaller than 3 degrees, and the center axis of the two through holes are located at the longitudinal mid vertical plane of the housing 100. More specifically, the retainer 201 is adapted for fixing the laser emitters 202-1 and 202-2 which are matched with their respective installation components to achieve laser focus and alignment. Taking the laser emitter 202-1 as an example, the installation component includes a spring 203-1 for adjusting focal length, a clamp ring 204-1, a lens 205-1 for focusing, a lens barrel 206-1 with aperture and a screw 207-1.

In the embodiment, the laser emitters 202-1 and 202-2 are driven in turn, the driving frequency is a quarter of the motor frequency, the wavelength of the laser beam is 650 nm, preferably, and the power density is much lower than the damage threshold of the human body and blood. Preferably, the laser beams from the laser emitters 202-1 and 202-2 are emitted at the same direction, and the angle is smaller than 3 degrees.

Figure 3:
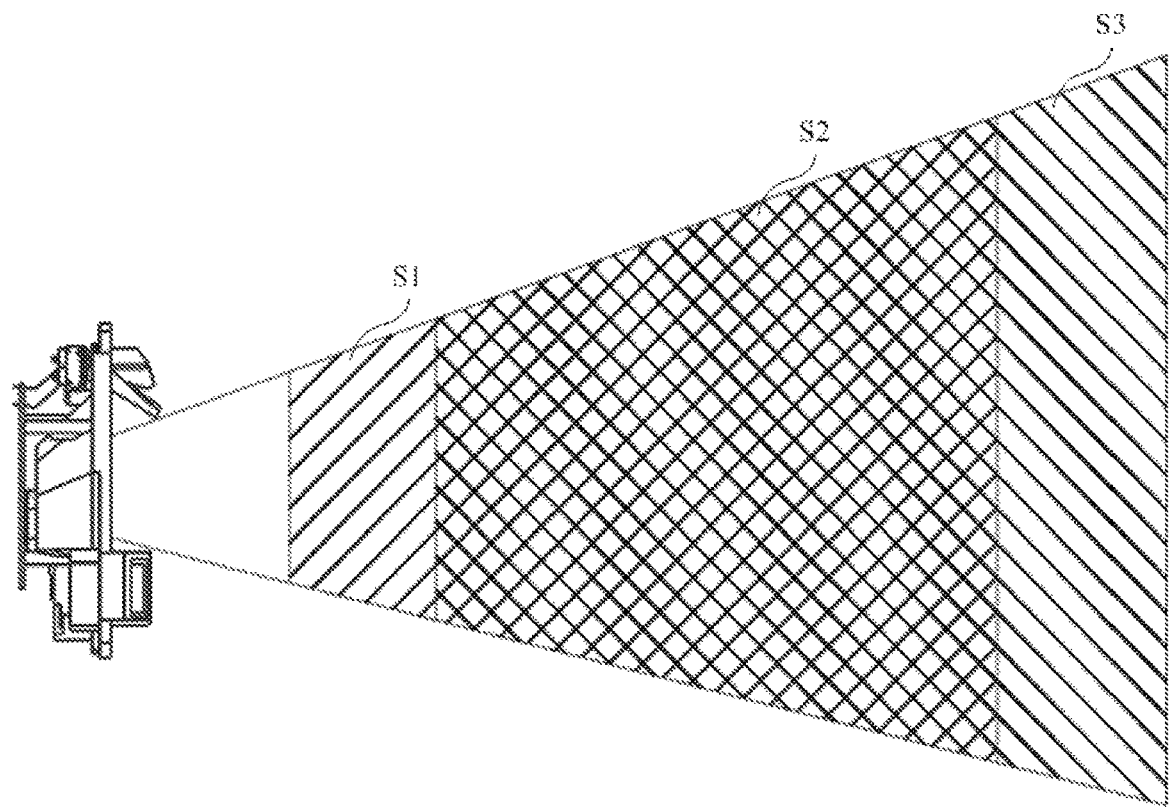
FIG. 3 is a schematic diagram of the double laser emitter focusing on different positions and different depth of field.

The laser beams emitted from the N laser emitters are focused and aligned by the lens and then spread at different positions from far to near, so that the N laser emitters cover depth of field in different ranges from far to near. As shown in FIG. 3, the double laser emitter is focused on different positions, and the depth of field of focusing on different positions is shown. Specifically, the areas S1 and S2 are the far depth of field and are handled by the laser beam 202-1, and the areas S3 and S4 are the near depth of field which are handled by the laser beam 202-2, therein the area S2 is the area which are commonly handled by the laser beams 202-1 and 202-2. In the embodiment, by tuning the screw 207-1, the working distance between the laser emitter 202-1 and the lens 205-1 is adjusted, so that a far position is focused, thereby the far depth-of-field area is handled by the laser emitter 202-1; by tuning the screw 207-2, the working distance between the laser emitter 202-2 and the lens 205-2 is adjusted, so that a near position is focused, thereby the near depth-of-field area is handled by the laser emitter 202-2.

Specifically, the N light projection reflectors 301, the rotatable reflector group 400, the tilted reflector group 501-506, and the light collection reflector 303 form an extension light path. As illustrated in FIG. 1, the N light projection reflectors 301 (including reflectors 301-1 and 301-2) are configured above the light source slot 102 and installed on the light projection reflector support 300 to match with the N laser emitters 202 (including the laser emitters 202-1 and 202-2) correspondingly.

In this embodiment, the N light projection reflectors 301 are tilted relative to a plane of the housing at different angles, so as to compensate the angles between the N laser beams emitted from the N laser emitters, thereby ensuring the laser beams to be collected quasi-coaxially.

The light collection reflectors 303 are configured at a front of the N light projection reflectors 301, and N light projection apertures are formed on the middle of the light collection reflectors 303 to match with the N light projection reflectors 301 correspondingly. As shown in FIG. 1, the light projection reflectors 301-1 and 301-2 are matched with the light projection apertures 302-1 and 302-2 respectively, so as to allow the laser beams reflected by the light projection reflectors 301-1 and 301-2 to pass through.

The rotatable reflector group 400 is formed on the recess and opposite to the N light projection reflectors (301-1, 301-2). Specifically, the rotatable reflector group 400 includes a motor and four reflectors 401, 402, 403, 404 at the sides, with an angle of 90 degrees formed between two adjacent reflectors. More specifically, the angles between the horizontal plane of the housing and each one of the four reflectors 401, 402, 403, 404 are arranged in an arithmetic progression, so that the eight laser rays emitted have uniform spacing. Preferably, the four reflectors 401, 402, 403, 404 are rotated at a certain frequency under the control of the motor, scanning beams are reflected from the reflectors 401, 402, 403, 404, and the scanning speed can be controlled by controlling the rotation speed of the motor, preferably is 68 Hz.

The tilted reflector group 501-506 is composed of a plurality of reflectors at different angles which are formed at the ring surface of the recess. Preferably, the tilted reflector group 501-506 is composed of six oblique trapezoidal reflectors 501, 502, 503, 504, 505, 506 with an obtuse angle formed between two adjacent reflectors. In addition, the six reflectors are tilted relative the horizontal plane of the housing 100, thereby a multi-directional scanning beam pattern composing of six sets of parallel rays is formed.

Figure 4:
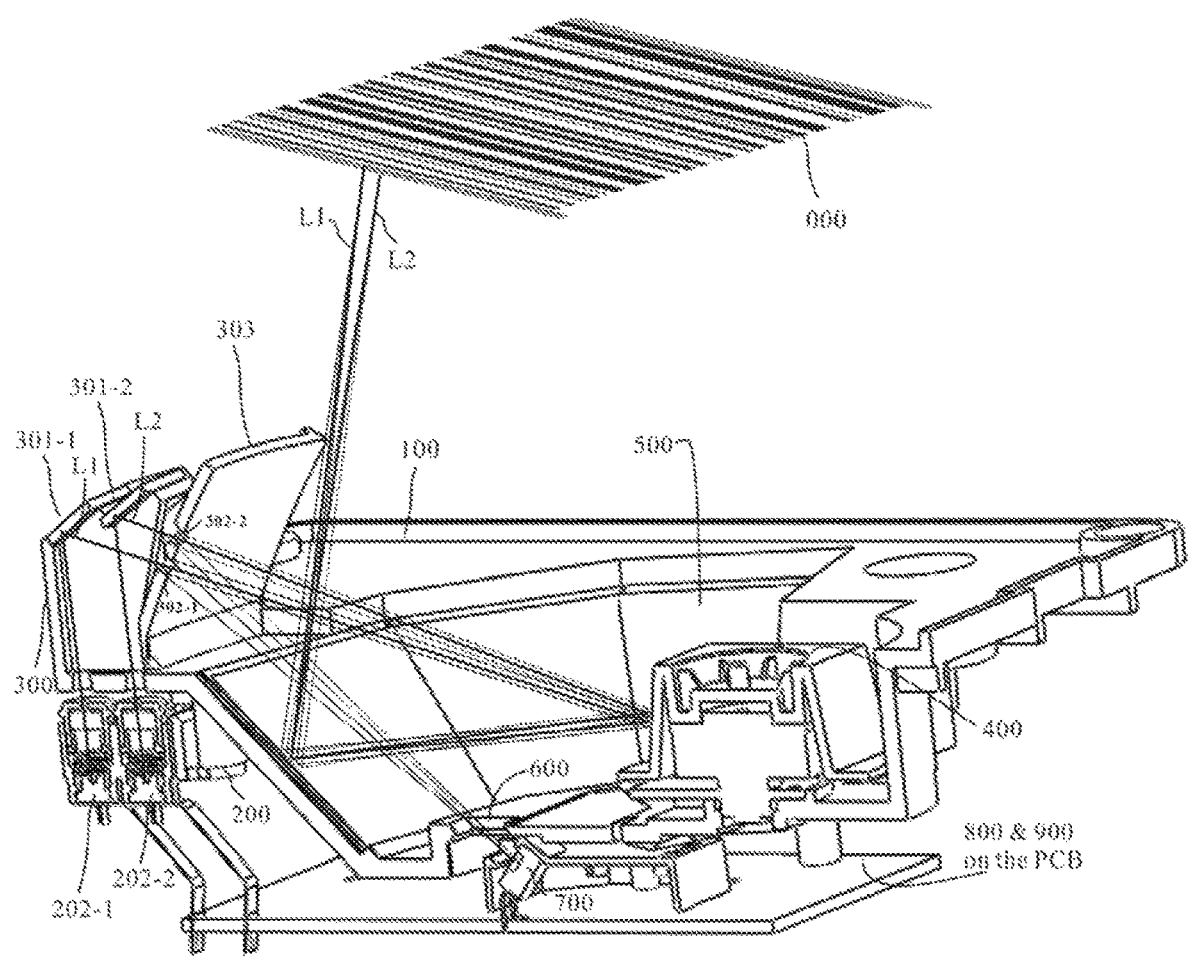
FIG. 4 is a schematic diagram of the multi-directional bar code scanning device providing bar code scanning lines.

Referring to FIG. 4, a schematic diagram of simulating scanning beams provided by the present embodiment. The recess 101 is provided with a light collection rectangular aperture 600, and the photosensitive receiver 700 which is a light sensor for converting light signals into electrical current signals or voltage signals is configured below the light collection rectangular aperture 600. A PCB (Printed Circuit Board) is formed at the bottom of the housing 100, on which a circuit and decoding module (800 & 900) is formed. Such a circuit and decoding module (800 & 900) is adapted for processing and decoding the electrical signals from the photosensitive receiver 700, for example, the process includes filtering and amplifying, etc., and the decode process can be completed by decoding programs or software. The bar code scanning device of the present invention utilizes a single photosensitive receiver to detect and convert the optical signals, and processes and decodes the optical signals by using a single channel, instead of utilizing multiple photosensitive receivers, therefore preventing non-coaxial optical signal crosstalk among the multiple photosensitive receivers, and reducing hardware cost and improving decoding performance.

In the present invention, the N laser beams emitter from the N laser emitter are projected on the light projection reflectors correspondingly, pass through the N light projection apertures on the light collection reflectors, then are reflected by the rotatable reflector group and the tilted reflector group in turn to form N baseline laser scanning beams to project on a target bar code. After scattered by the target bar code, the N baseline laser scanning beams are reflected to the light collection reflectors and focused to the photosensitive receiver which converts an optical signal to an electrical signal.

Figure 5:
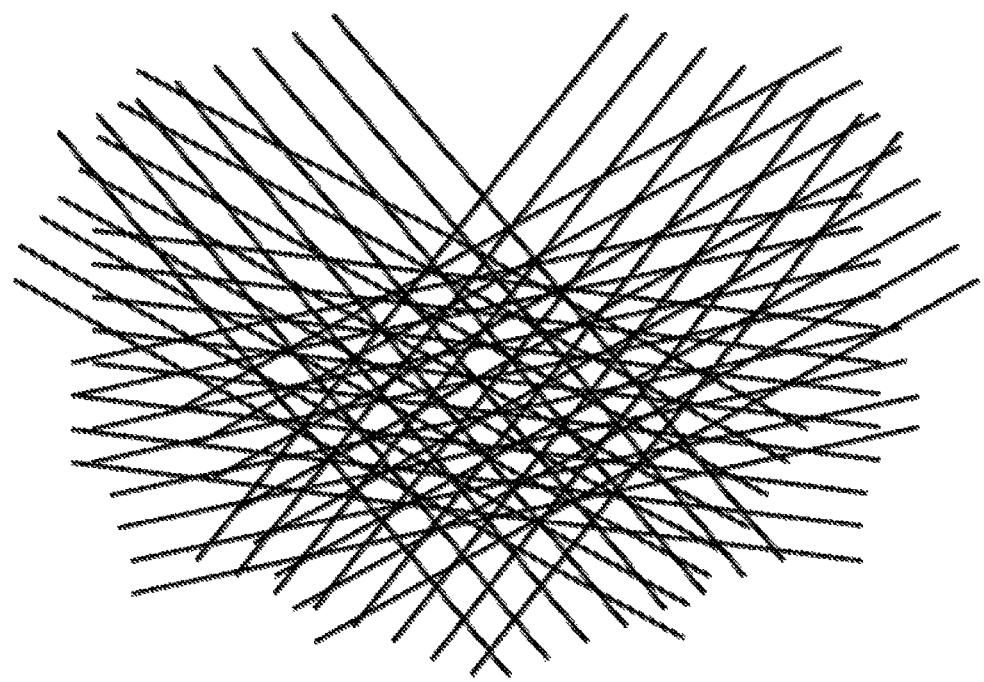
FIG. 5 is a schematic diagram of bar code scanning line pattern provided by the multi-directional bar code scanning device in FIG. 1.

As shown in FIG. 4, two paths of beams are emitted from the laser emitters 202-1 and 202-2, and then focused by the respective lens 205-1 and 205-2 to form the beams L1 and L2. Specifically, the beams L1 are emitted to the light projection reflector 301-1 and pass through the light projection aperture 302-1 to reach the rotatable reflector 401, and the beams L2 are emitted to the light projection reflector 301-2 and pass through the light projection aperture 302-2 to reach the rotatable reflector 401. After that, the beams L1 and L2 are reflected by the rotatable reflector 401 and then projected to the tilted reflector 504, so that two baseline laser scanning beams are formed to project to the target bar code 000. Along with the rotation of the rotatable reflector group 400, the scanning beams form multiple-directional beam mesh pattern with six sets of parallel laser rays, as shown in FIG. 5. After scattered by the bar code, the beams L1 are reflected to the light collection reflector (around the light aperture 302-1), and the beams L2 are reflected to the light collection reflector (around the light aperture 302-2) against the light projection path. Finally, the beams L1 and L2 are focused by the light collection reflector to pass through the rectangular aperture 600 and reach to the photosensitive receiver 700, so far, the quasi-coaxial light gather process by using a double laser emitter with a single photosensitive receiver is achieved, and the double laser beam after recycled and focused is converted to electrical signals which are transferred to the circuit and decoding module to process.

It's should be noted that, the light projection aperture 302-1 and the light projection aperture 302-2 need to satisfy the following mathematical relationship. Taking the direction of the beams emitted from the laser emitter 202-1 and the lens 205-1 as a reference (the direction is perpendicular to the plane of the housing 100), assuming that the horizontal distance from the light projection aperture 302-2 to the reference is a, the horizontal distance from the light projection aperture 302-1 to the reference is b, and a and b should satisfy the following equations:

$$\frac{3941 - 35.09*a}{\sqrt{(1.04*a - 57.46)^2 + 403.78}} + a = \frac{3528 - 25.49*b}{\sqrt{(1.01*b - 54.42)^2 + 442.45}} + b$$

$$(2*x - a - b)*(b - a) = \left( (2*y) - 34.25 + 0.23*a + 0.14*b \right) *$$

$$(40.01 - 0.23*a + 0.14*b),$$

-continued therein $$x = \frac{1}{k_a - k_b} * (a*k_a - b*k_b - 4.18 + 0.23*a - 0.14*b)$$

$$y = \frac{1}{k_b - k_a} * [(0.23*a - 18.54)*k_b - (0.14*b - 14.31)*k_a + (b-a)*k_a*k_b]$$

$$k_a = \frac{\sqrt{(1.04*a - 57.46)^2 + 403.78} + 0.69*a - 30.19}{50.24 - 0.55*a}$$

$$k_b = \frac{\sqrt{(1.01*b - 54.42)^2 + 442.45} + 0.78*b - 35.81}{45.31 - 0.39*b}$$

Figure 6:
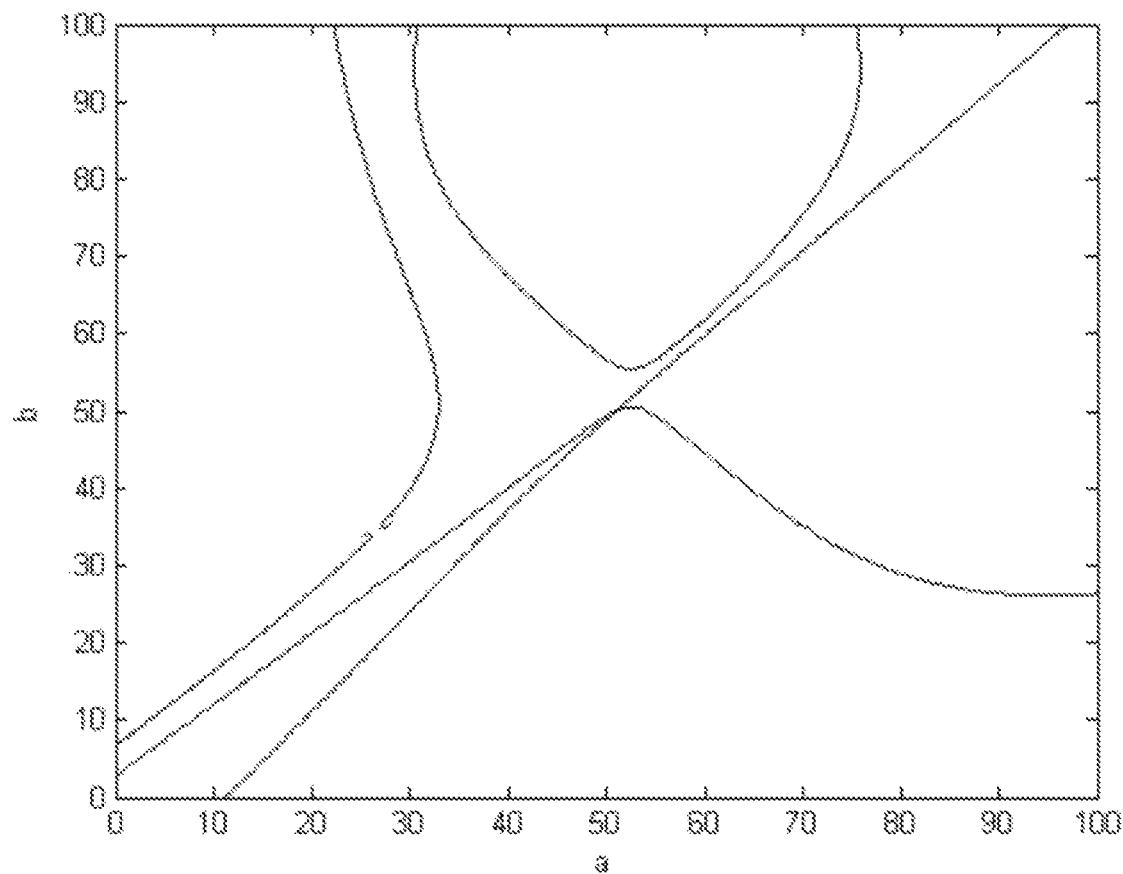
FIG. 6 is a function graph of the equation set which the positions of the two light projection apertures meet.

By plotting the above equations, the drawing is shown as FIG. 6, the point of intersection in the FIG. 6 indicates the mathematical relationship of the light projection aperture 302-1 and the light projection aperture 302-2, by means of which the present invention is created.

As mentioned in the background, in the prior art, the conventional bar code scanner with a single laser emitter cannot extend to both high-resolution depth of field and low-resolution depth of field, while the conventional bar code scanner with multiple laser emitters matching with multiple photosensitive receivers brings non-coaxial optical signal crosstalk issue, and the multiple laser emitters cannot work synchronously if single channel is utilized in both photoelectric conversion and decoding mode. On the contrary, the multi-directional bar code scanning device having multiple laser emitters matched with a single photosensitive receiver preferably uses rotatable tetrahedral mirrors (with rotating speed is 68 Hz) and hexahedral titled mirrors to achieve scanning line extension and light path extension, thereby increasing the scanning direction and the scanning line quantity (48 scanning lines, six directions), and improving bar code scanning speed and recognition effect. By using multiple laser emitters to handle the far depth of field and the near depth of field, thereby the high-resolution depth of field and low-resolution depth of field are extended. Further, by using a single photosensitive receiver to achieve quasi-coaxial light gather process, thereby optical signal crosstalk is prevented, the hardware cost is reduced and decoding performance is improved.

While the invention has been described in connection with what are presently considered to be the most practical and preferable embodiments, it is to be understood that the invention is not to be limited to the disclosed embodiments, but on the contrary, is intended to cover various modifications and equivalent arrangements included within the spirit and scope of the invention.

What is claimed is:

1. A multi-directional bar code scanning device having multiple laser emitters matched with a single photosensitive receiver, comprising:
    a housing, with a recess formed on a middle of the housing, a light source groove and a light projection reflector support being provided at a side of the housing, and a light collection rectangular aperture formed on a bottom of the recess;
    N laser emitters, fixed in the light source groove via an installation component and adapted for emitting N laser beams and projecting the N laser beams at a certain projected path, therein N is an integer and N≥2;
    N light projection reflectors, located above the light source groove and mounted on the light projection reflector support to match with the N laser emitters correspondingly;
    a light collection reflector, located at a front of the N light projection reflectors, with N light projection apertures being formed on a middle of the light collection reflector to match with the N light projection reflectors correspondingly;
    a rotatable reflector group, configured in the recess and located opposite to the N light projection reflectors;
    a tilted reflector group, including a plurality of reflectors at different angles which are configured at a ring surface of the recess; and
    a single photosensitive receiver, located beneath the light collection rectangular apertures and opposite to the light collection reflectors;
    wherein the N laser beams emitted from the N laser reflectors are emitted to the N light projection reflectors correspondingly, pass through the N light projection apertures on the light collection reflector, then are reflected by the rotatable reflector group and the tilted reflector group in turn to form N baseline laser scanning beams to project on a target bar code; after scattered by the target bar code, the N baseline laser scanning beams are reflected reversely to the light collection reflectors and focused to the photosensitive receiver which is arranged for converting an optical signal to an electrical signal,
    wherein the laser beams emitted from the N laser emitters are focused and aligned by the lens and then spread at different positions from far to near.

2. The multi-directional bar code scanning device according to claim 1, wherein N=2, and the N laser emitter are emitted at the same direction, with angles between the N laser beams are smaller than 3 degrees.

3. The multi-directional bar code scanning device according to claim 2, wherein the N light projection reflectors are tilted relative to a horizontal plane of the housing at different angles.

4. The multi-directional bar code scanning device according to claim 1, wherein the N laser emitters are driven in turn, with a driving frequency is a quarter of motor frequency of the rotatable reflector group.

5. The multi-directional bar code scanning device according to claim 4, wherein the rotatable reflector group includes a motor and four reflectors located at a side of the motor, angles formed between each reflector and a horizontal plane of the housing are arranged in an arithmetic progression, and the four reflectors are rotatable at a certain frequency under control of the motor.

6. The multi-directional bar code scanning device according to claim 5, wherein the tilted reflector group is composed of six oblique trapezoidal reflectors with an obtuse angle formed between two adjacent reflectors, and a multi-directional scanning beam pattern composing of six sets of parallel rays is formed.

7. The multi-directional bar code scanning device according to claim 1, further comprising:
    a circuit and decoding module adapted for processing and decoding the electrical signals from the photosensitive receiver, thereby obtaining information of the target bar code.

* * * * *